J. BEAUMONT.
Coffee Pot.
No. 30,559.
Patented Nov. 6, 1860.
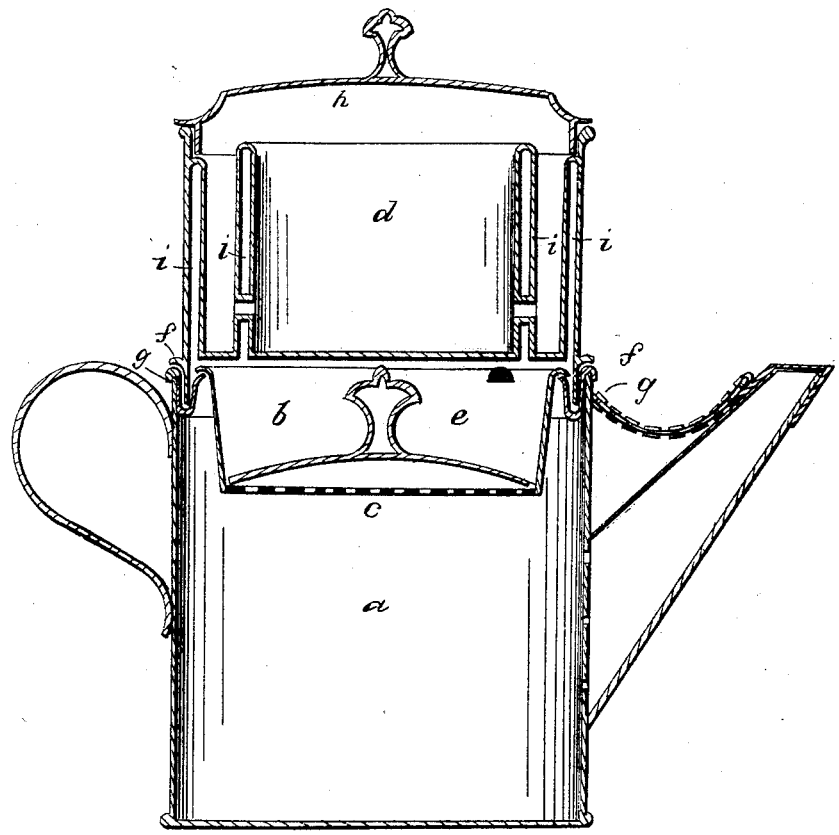
Witnesses
Inventor
John Beaumont

UNITED STATES PATENT OFFICE.

JOHN BEAUMONT, OF HARTFORD, CONNECTICUT.

COFFEE-POT.

Specification of Letters Patent No. 30,559, dated November 6, 1860.

*To all whom it may concern:*

Be it known that I, JOHN BEAUMONT, of Hartford, county of Hartford, and State of Connecticut, have invented a certain new and useful Improvement in Coffee-Pots; and I do hereby declare that the same is described and represented in the following specification and drawings; and to enable others skilled in the art to make and use the said improvement I will proceed to describe its construction and operation, referring to the drawings, in which the same letters indicate like parts in each of the figures.

The nature of this improvement consists in providing (in addition to a tea, or coffee pot as ordinarily constructed) a tea or coffee receptacle, with a riddled bottom, upon which to place the tea or coffee and a perforated cover laid over the tea or coffee, thus securing the leaf or berry between the riddled bottom of the cup, and the perforated cover, the object of which is to prevent the wash of the nutriment placed therein when water is poured in upon the cover, and secure it in a proper shape to be steamed, and secure the beverage (when ready for use) free from sediment. Also, in providing a cup, the bottom rim of which, and its lid (lid of the cup) made so as to fit into a liquid joint and prevent the escape of steam, or the aroma. Said cup is provided with narrow cavities (or small tubular elevations) extending nearly from the lid or top of the cup to the bottom thereof, the cup being supplied with cold water, so that when the boiling water is poured on to the tea or coffee, or into the pot through the receptacle, and the cup placed thereon, (containing cold water) the steam will penetrate the tea or coffee, extracting its palatable nutriment, and ascending into the aforesaid cavities, is condensed and falls back into the water, thus extracting and securing in the most perfect manner the essential essence of the tea or coffee in the beverage and in readiness for use when desirable without any loss of its aroma.

In the accompanying drawings $a$, is the pot as ordinarily constructed.

$b$, is the receptacle for the tea or coffee, having a riddled bottom $c$, and a perforated lid or cover $e$, between which the tea or coffee is placed for steaming and rests upon the inner edge of the water joint $f$, so that the steam rising up through its contents, is condensed and is free to run back through the same into the pot.

$d$, is a cup or receptacle for receiving cold water, the bottom rim, $g$, and the lid $h$, of which is made so as to fit into the water joint at $f$, inside of the top of the pot. Around the inside of the body of said cup is formed a cavity $i$, or in other words, is formed an inner cup, its upper edge being secured just below the upper edge of the cup proper, thus forming a cavity $i$, between the inner and the outer cup. I also make what I call a double cup by elevating a ring $i$, from the bottom upward (without the outer cavity $i$) so as to produce a greater condensing surface when necessary. (I also propose sometimes to elevate tubes from the bottom, open through the bottom and close at the top, yet I do not believe it to be so good a way to form condensing surface.) Thus it will be seen that when the tea or coffee is placed in the receptacle $b$, between the riddled bottom $c$, and its perforated cover $e$, and the pot $a$, supplied with the proper measure of boiling water, for a given quantity of tea or coffee, and the cup $d$, placed therein (on the pot, $a$,) and nearly filled with cold water and the pot placed on a stove or coals so as to receive the ordinary heat required to boil the contents, the steam penetrates the substance of whatever herb, plant, or berry, it may be, extracting its virtue therefrom, which arises into one, or both of the cavities (if both are used) when it will condense and fall back into the water and in a few moments the whole virtue thereof will be precipitated into a delicious beverage, superior in its flavor, in proportion to the quality of the herb, plant or berry, to that produced from any other of the many devices heretofore known and used for that purpose.

I believe I have thus shown the nature, construction, and operation of my improvement so as to enable a person skilled to make and use the same, and in doing so I have shown the superior advantage derived from its use over others.

I claim—

The arrangement, in the manner and for the purpose hereinbefore specified, of the coffee pot $a$, provided with the liquid joint $f$, the receptacle $b$, having the perforated bottom $c$, and perforated cover $e$, and the condenser $d$, provided with the cavity $i$.

In testimony whereof I have hereunto set my hand and affixed my seal.

JOHN BEAUMONT. [L. S.]

Witnesses:
    EDWARD M. BLISS,
    JEREMY W. BLISS.